United States Patent [19]

Agujaro

[11] Patent Number: 4,746,811

[45] Date of Patent: May 24, 1988

[54] DEVICE FOR PICKING UP CONTROL SIGNALS FOR CONVEYOR UNITS, PARTICULARLY CARRIAGES OF CONVEYOR LINES FOR INDUSTRIAL PLANTS

[75] Inventor: Roberto Agujaro, Turin, Italy

[73] Assignee: Pianelli & Traversa S.a.s., Italy

[21] Appl. No.: 7,700

[22] Filed: Jan. 28, 1987

[30] Foreign Application Priority Data

Jan. 28, 1986 [IT] Italy .............................. 52902/86[U]

[51] Int. Cl.⁴ .............................................. G05B 11/00
[52] U.S. Cl. .................................. 307/147; 318/135;
318/687; 340/52 R; 310/12; 310/13; 104/281;
104/283
[58] Field of Search ................ 307/147; 198/854, 855,
198/856, 857, 858, 859, 571, 576, 577, 579, 581,
805; 310/12, 13, 14; 318/135, 685, 687, 696,
138, 254; 104/281, 283, 284, 290, 293; 340/52
R, 52 F; 280/407, 438

[56] References Cited

U.S. PATENT DOCUMENTS

| | | | |
|---|---|---|---|
| 3,638,093 | 1/1972 | Ross | 318/135 X |
| 3,735,231 | 5/1973 | Sawyer | 318/135 X |
| 3,749,025 | 7/1973 | Giraud | 104/290 X |
| 3,906,262 | 9/1975 | Shichida et al. | 310/13 X |
| 3,940,676 | 2/1976 | Dudley | 318/135 X |
| 4,456,934 | 6/1984 | Wedman et al. | 318/687 X |
| 4,463,290 | 7/1984 | Asakawa et al. | 318/687 X |
| 4,491,777 | 1/1985 | Beck et al. | 318/687 X |
| 4,509,001 | 4/1985 | Wakabayashi et al. | 318/687 |
| 4,590,411 | 5/1986 | Kelly | 318/687 |
| 4,595,870 | 6/1986 | Chitayat | 318/687 |
| 4,607,203 | 8/1986 | Bohm et al. | 318/687 |
| 4,618,808 | 10/1986 | Ish-Shalom et al. | 318/685 X |
| 4,626,749 | 12/1986 | Asakawa | 318/135 |
| 4,649,369 | 3/1987 | Walker et al. | 340/52 R |

Primary Examiner—William M. Shoop, Jr.
Assistant Examiner—Paul Ip
Attorney, Agent, or Firm—Sughrue, Mion, Zinn, Macpeak, and Seas

[57] ABSTRACT

The device comprises two pick-up elements which can cooperate independently with a transmission line for control signals and are aligned in the direction of movement of a conveyor unit so as to be positioned respectively upstream and downstream in the direction of movement of the conveyor unit. The two pick-up elements are separated by a distance such that, during traversal of the gaps between successive sections of the line, at least one of the two pick-up elements is able to receive signals from the transmission line. A signal treatment circuit generates selectively an output control signal corresponding either to the single signal received by the two pick-up elements or to the control signal received by the pick-up element in the position upstream relative to the direction of movement of the conveyor unit when the pick-up elements receive different signals.

5 Claims, 1 Drawing Sheet

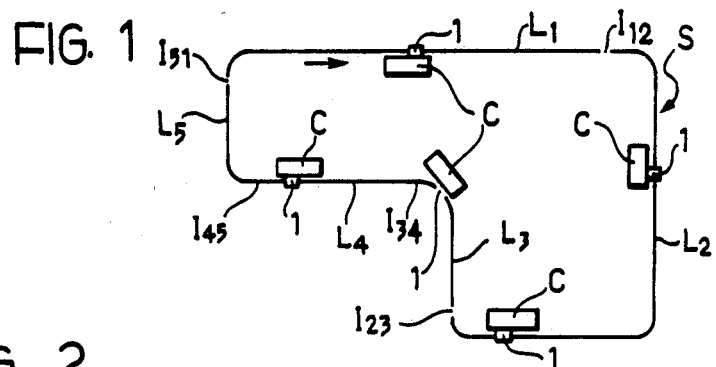
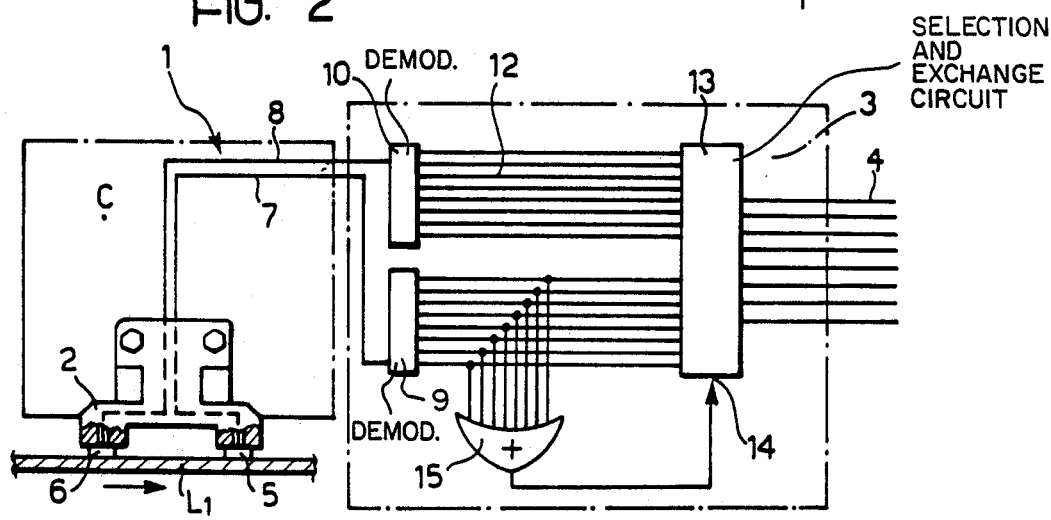
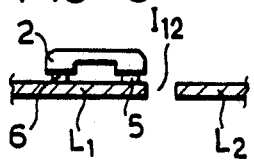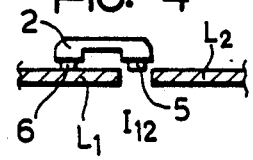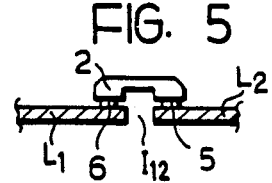
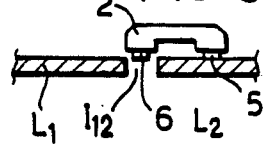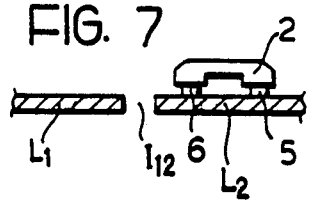

DEVICE FOR PICKING UP CONTROL SIGNALS FOR CONVEYOR UNITS, PARTICULARLY CARRIAGES OF CONVEYOR LINES FOR INDUSTRIAL PLANTS

The present invention relates to devices for picking-up control signals and particularly concerns a device intended for mounting on a conveyor unit movable along a path defined by a transmission line for movement control signals.

The device according to the invention has been developed for possible use in the field of conveyor systems for industrial plants, such as that described in copending U.S. patent application Ser. No. 942,753 filed Dec. 17, 1986 in the name of Alberto Guglielmo and assigned to the same assignee as the present application.

In particular, in this previous application, a method and a device are described which, by the emission of coded signals transmitted on a single conductor line (bus bar), enable signals for controlling different movements (for example, slow advance, fast advance, inertial stopping, braked stopping . . . ) to be transmitted to motor-driven carriages (self-propelled carriages) constituting the conveyor units of the system.

In numerous situations of use, there is a need to divide the transmission line for the control signals into several successive portions or sections so as to allow different movement controls to be sent to the conveyor unit which is moving through the different sections of the conveyor path of the system. The different sections of the transmisson line for the control signals must necessarily be separated from each other by isolating gaps of predetermined width, each of which extends between two adjacent sections of the transmission line for the control signals.

It is thus necessary to be able to ensure that, even when a conveyor unit is in correspondence with one of these gaps, it can receive the movement control signals transmitted to it. For this purpose, according to a known solution, it is possible to provide the conveyor units with "double-shoe" pick-up devices which can extend in the form of a bridge across the space between two successive sections of a transmission line for control signals, thus ensuring the transmission of the signals to the conveyor unit.

This solution gives rise, however, to a functional disadvantage which considerably limits the convenience of use of the system. In fact, it is necessary to ensure that, every time one of the conveyor units with double-shoe pick-ups passes one of the gaps between two sections of the transmission line for control signals, different control signals are not transmitted simultaneously on the two sections in question. In addition to a situation of incompatibility or conflict between two different controls, the transmission of two different signals on the two adjacent sections which are put momentarily into contact with each other by the shoe could trigger short-circuiting.

The object of the present invention is to provide a device for picking-up control signals, intended for mounting on a conveyor unit, such as the carriages of a conveyor line in industrial plants, which does not give rise to the disadvantages explained previously and is thus improved in terms of efficiency and convenience of application and use.

According to the present invention, this object is achieved by a device for picking-up control signals, intended to be mounted on a conveyor unit movable along a path defined by a transmission line for movement control signals, the transmission line being divided into several successive sections which can convey respective control signals and are separated by isolation gaps of predetermined width, each of which extends between two of the sections characterized in that it includes:

two pick-up elements which can cooperate independently with the transmission line to receive signals and are movable along the line as a result of the movement of the conveyor unit; the two pick-up elements being aligned with each other in the direction of movement of the conveyor unit so as to be positioned respectively upstream and downstream in the direction of movement of the conveyor unit and being separated by a distance, with reference to the predetermined width, such that, during traversals of the gaps, at least one of the two pick-up elements is able to receive signals with the transmission line, and a signal treatment circuit sensitive to the signals received by the two pick-up elements and able to distinguish at least a first and second operative condition corresponding respectively to the reception of a single control signal by at least one of the two pick-up elements and the reception of two different control signals by the two pick-up elements, and to generate selectively an output control signal corresponding respectively to the single control signal in the first operative condition and to one and only one of the two different control signals in the second operative condition.

Further characteristics and advantages of the invention will become apparent from the description which follows, purely by way of non-limiting example, with reference to the appended drawings, in which:

FIG. 1 shows schematically a conveyor system for industrial plants including a plurality of conveyor units, each provided with a device according to the invention for picking-up movement control signals, FIG. 2 illustrates the structure of the pick-up device of the invention, partially in block-schematic form, and FIGS. 3 to 7 illustrate schematically several different operating conditions of the pick-up device of the invention.

In FIG. 1, a conveyor system such as, for example, a conveyor line for industrial plants is generally indicated S.

The system S comprises a plurality of carriages (conveyor units) C which move along a conveyor path defined by a transmission line for control signals which is divided into several sections, indicated $L_1$–$L_5$ respectively.

More precisely, the carriages C are supported by or suspended from rails or guides (not explicitly illustrated) and their movement is driven by motors provided on the carriages (self-propelled carriages).

The transmission line constituted by the sections $L_1$–$L_5$ extends along the path of movement of the carriages C and is intended to enable the transmission of movement control signals (fast advance, slow advance, inertial stoppage, braked stoppage, etc.) to the motors of the carriages C.

For a more complete description of a possible embodiment of a system for the transmission of control signals of this type, reference should be made to the previous patent application by the same Applicant, already cited in the introduction to the present specification.

The fact that the transmission line for the control signals is divided into several portions or sections $L_1$–$L_5$ enables different control signals to be fed to the carriages C which are on the various sections of the line at any moment.

There may thus be imparted to each carriage C, for example, a movement of rapid advance along the sections $L_1$ and $L_4$, a movement of slow advance in correspondence with the sections $L_2$ and $L_5$, a movement with selectively predetermined periods of stoppage in correspondence with the section $L_3$, etc. It is thus possible to adapt the operation of the various sections of the system to the conveyor requirements of the industrial plant in which the system is installed. The various sections $L_1$–$L_5$ of the transmission line for the control signals are separated from each other by isolating gaps $I_{12}$, $I_{23}$, $I_{34}$, $I_{45}$, $I_{51}$ in order to avoid the controls transmitted on one of the sections $L_1$–$L_5$ from being transmitted accidentally to the adjacent sections.

The operation of the motor of each carriage C is regulated by control signals taken from the transmission line $L_1$–$L_5$ through a pick-up device, generally indicated 1 mounted on the carriage itself.

As best seen in the diagram of FIG. 2, the device 1 is constituted essentially by two parts, that is to say:

a sensor or shoe 2 intended to slide on the transmission line $L_1$–$L_5$ as a result of the movement of the carriage C, and a processing network 3 which receives the signals picked up by the sensor 2 and transmits them to the circuits for operating the motor on the carriage through output lines, generally indicated 4.

Purely by way of example, it will be assumed that the control signal is present in the form of an 8-bit digital signal transmitted in parallel on 8 output lines 4.

The sensor or shoe 2 has a generally forked configuration and, at its free ends, has two pick-up elements 5 and 6 constituting two electrical sliding contacts cooperating with the transmission line $L_1$–$L_5$.

The position of assembly of the shoe 2 on the carriage C is chosen so that the two pick-up elements 5 and 6 are aligned with each other in the direction of movement of the carriage C. They are located at a distance which, with reference to the width of the gaps $I_{12}$–$I_{51}$ separating the various sections $L_1$–$L_5$ of the signal transmission line, is such as to ensure that, during traversal of each of these gaps, at least one of the pick-up elements 5, 6 is in a position to receive signals from one section of the transmission line.

For this purpose, it suffices to place the pick-up elements 5 and 6 at a distance of not less than the width of the gaps $I_{12}$–$I_{51}$.

Thus, as shown schematically in FIGS. 3 to 7, during the traversal of any one of these gaps $I_{12}$–$I_{51}$, the following operating conditions occur in sequence:

both of the pick-up elements 5 and 6 are in contact with the section of transmission line ($L_1$) which is upstream of the gap in the direction of movement of the carriage C (FIG. 3), the pick-up element which is in front or upstream, that is, the element 5, passes the gap and loses contact with the transmission line for control signals, while the pick-up element at the rear or downstream, that is, the element 6, continues to maintain contact with the section $L_1$ upstream of the gap (FIG. 4), the upstream pick-up element 5, which has passed this gap completely, re-establishes contact with the section of transmission line downstream of the gap, while the downstream pick-up element continues to maintain contact with the section upstream of the gap (FIG. 5), the downstream pick-up element 6 passes the gap and leaves the transmission line, while contact with the line itself is ensured by the upstream pick-up element 5 which slides on the line (FIG. 6), and the downstream pick-up element 6 renews contact with the transmission line for control signals to re-establish the normal operating condition in which both pick-up elements 5, 6 are in contact with the control transmission line $L_1$–$L_5$.

The pick-up elements 5, 6 are connected through respective lines 7, 8 to separate decoding circuits 9, 10 forming part of the processing network 3.

Each of the demodulating circuits 9, 10 is able to produce, from the signals picked up by the respective pick-up elements 5 or 6, a respective control signal on the respective output line 11, 12, which is structurally similar to that which must be sent to the motor through the lines 4.

In other words, according to the simplified terminology used in the claims below, each pick-up element 5, 6 can cooperate independently with the transmission line $L_1$–$L_5$ to receive signals.

With regard to a possible embodiment of each demodulator 9 and 10, reference is made to the detailed description of such a circuit provided, particularly with reference to FIG. 4, in copending application Ser. No. 942,753. More particularly, in this previous application, the diagram of a demodulator circuit intended to operate on coded control signals formed from a sine wave is described.

Naturally, the circuit structure of the demodulators 9 and 10 must be adapted from time to time to the specific format (analogue signals, TTL signals, etc.) used for the transmission of the control signals on the line $L_1$–$L_5$.

A selection and exchange circuit, indicated 13, can convey, as output control signals on the lines 4, the control signal present on the lines 11 or the signal present on the lines 12 alternately. The choice is made in dependence on an enabling control signal present at an input 14 to which the output signal of a logic gate 15 connected to the output 11 of the demodulator 9 is applied.

The circuit 13 may be constituted, for example, by two integrated 74 LS 257 circuits (each operating on 4 bits) combined so as to be able to treat the 8 bits of the lines 4, 11 and 12. Alternately, when the network 3 has an operating frequency controlled by a clock, it is possible to use the integrated 74 LS 604 circuit for the circuit 13.

In the embodiment illustrated, the connection configuration of the circuit 13 is such that the control signal present on the lines 11 is transmitted through the lines 4 as the output control signal when the signal at the input 14 is at logic level 1, while the control signal present on the lines 12 is transmitted on the lines 4 when the signal at the input 14 is at logic level 0.

The logic gate 15 that generates the signal present at the input 14, in an embodiment simplified for clarity of illustration, is therefore an OR logic gate which forms the logic sum of the signals present on the lines 11. Thus, the signal at the input 14 is at logic level 1 each time a control signal is present at the output of the demodulator 9.

In other words, the selection logic implemented by the network 3 is that on the basis of which the output control signal transmitted to the operating circuits of the motor through the lines 4 corresponding to the signal present on the lines 11, that is, to the control signal received from the pick-up element 5 which is upstream in the direction of movement of the carriages C each time the presence of this latter signal is detected (by the gate 15, acting as a sensor member).

Only when the pick-up element 5 cannot receive a control signal is the carriage motor (line 4) controlled by the control signal present on the lines 12, that is, by the control signal received from the downstream pick-up element 6.

The selection logic described above enables the continuous control of the carriage motor, avoiding any inconvenience which could result from the transmission of two different control signals on two adjacent sections of the transmission line $L_1-L_5$.

With reference to the operating conditions illustrated schematically in FIGS. 3 to 7, two different operative conditions may in fact be distinguished for the pick-up device 1.

The first condition is that corresponding to FIGS. 3, 4, 6 and 7, which occurs when:

both the pick-up elements 5, 6 are in contact with the same section of the transmission line and thus receive identical control signals (FIG. 3, FIG. 7), or just one of the pick-up elements is in contact with the transmission line and receives a control signal, while the other pick-up element is momentarily in the gap and thus does not receive any signal (FIG. 4, FIG. 6).

In this first operative situation, the network 3 feeds to the output lines 4 the sole control signal effectively received at its input either from both the pick-up elements 5, 6 or from the pick-up element which is the only one able to receive a signal from the transmission line $L_1-L_5$ at that moment.

The second operative condition is that which occurs in the situation illustrated in FIG. 5, when two different control signals are present at the input of the network 3, these being received independently from the pick-up elements 5 and 6 on two different sections of the line $L_1-L_5$. In this case, the network 3 resolves the uncertain situation by choosing the control signal present on the lines 22, that is, the control signal received from the pick-up element 5 in the upstream position.

This selection logic is seen to be preferable in that it enables the motor which regulates the movement of the carriage to receive a control signal corresponding to the "future" part and not the "past" part of its path of movement.

What is claimed is:

1. A control system for a conveyor unit movable along a predetermined path said system comprising a transmission line for movement control signals adapted to extend along said path, the transmission line being divided into several successive sections which can convey respective control signals and are separated by isolation gaps of predetermined width, each of which extends between two of the sections, two pick-up elements adapted to be mounted on a conveyor unit for movement along said transmission line to receive signals therefrom said two pick-up elements being aligned with each other in the direction of movement of the conveyor unit so as to be positioned respectively upstream and downstream in the direction of movement of the conveyor unit and being separated by a distance, with reference to the predetermined width, such that, duing traversal of the gaps, at least one of the two pick-up elements is adjacent a section of said transmission line to receive signals from the transmission line, and signal treatment circuit means sensitive to the signals received by the two pick-up elements to distinguish at least a first and a second operative condition corresponding respectively to the reception of a single control signal by at least one of the two pick-up elements and the reception of two different control signals by the two pick-up elements, and to generate selectively an output control signal corresponding respectively to the single control signal in the first operative condition and to one and only one of the two different control signals in the second operative condition.

2. A device according to claim 1, wherein in the second operative condition, the one and only one of the two different control signals is the control signal received by the pick-up element in the upstream position in the direction of movement of the conveyor unit.

3. A device according to claim 1, wherein the signal treatment circuit includes a sensor member for sensing the presence of the signal received by the pick-up element in the upstream position in the direction of movement of the conveyor unit, and selector means for generating the output control signal from the signal received by the pick-up element in the upstream position in the direction of movement of the conveyor unit.

4. A device according to claim 1, having a generally forked configuration and wherein the pick-up elements are constituted by electrical contacts which slide on the transmission line.

5. A device according to claim 1, wherein the pick-up elements are at a distance of not less than the predetermined width of the gaps.

* * * * *